May 26, 1925.  1,539,552
C. FARMER
POTATO PLANTING MACHINE
Filed Oct. 3, 1924  3 Sheets-Sheet 1
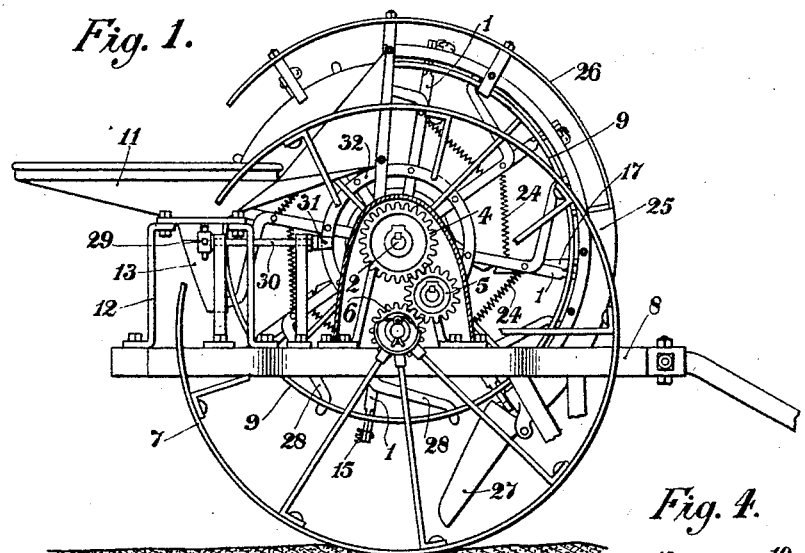
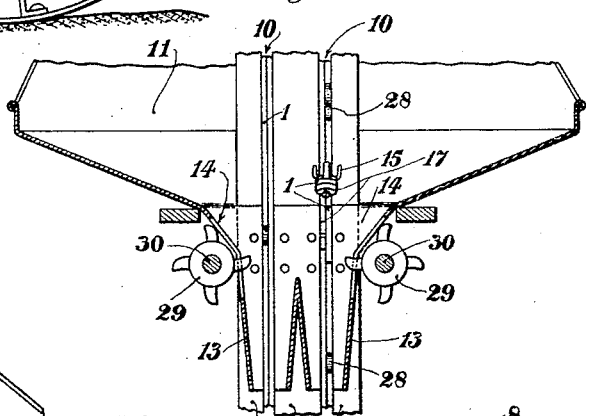
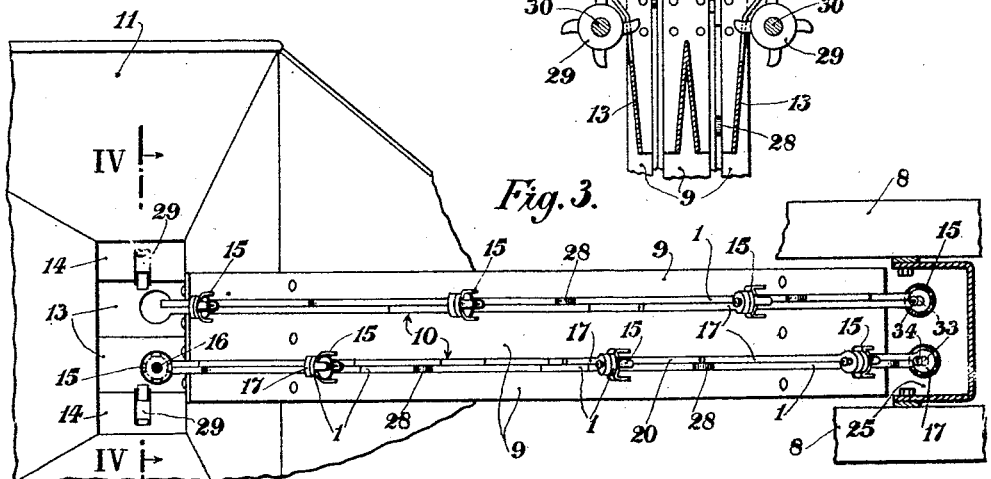
INVENTOR:
Charles Farmer
BY: Francis E. Boyes
ATTORNEY May 26, 1925.  1,539,552
C. FARMER
POTATO PLANTING MACHINE
Filed Oct. 3, 1924   3 Sheets-Sheet 3
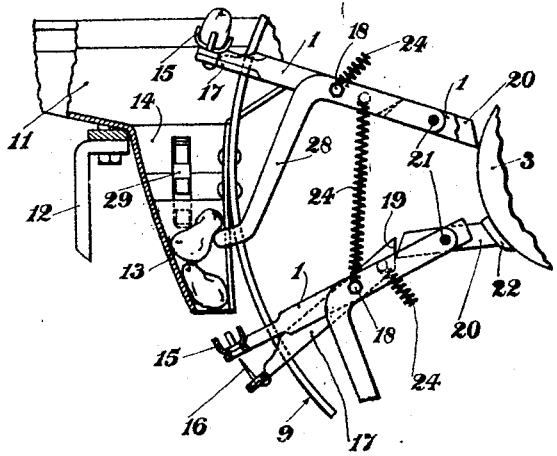
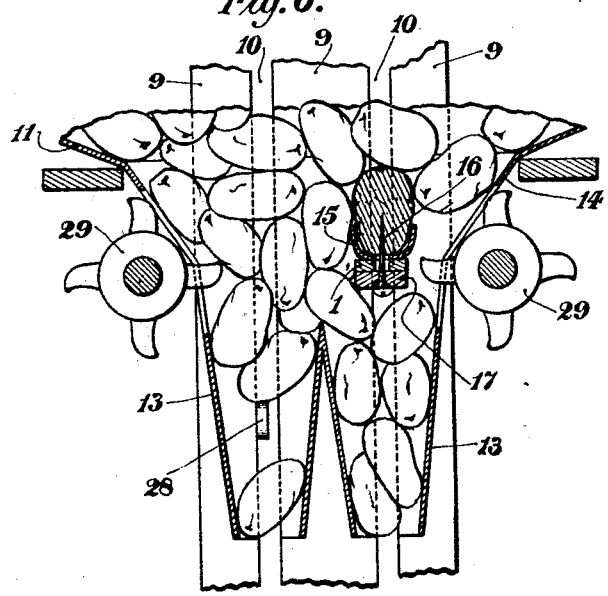
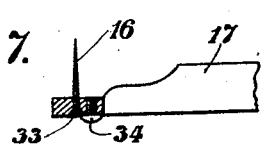
INVENTOR:
Charles Farmer
BY: Francis E. Bayer
ATTORNEY Patented May 26, 1925.

1,539,552

UNITED STATES PATENT OFFICE.

CHARLES FARMER, OF ROMSLEY, NEAR HALESOWEN, ENGLAND.

POTATO-PLANTING MACHINE.

Application filed October 3, 1924. Serial No. 741,339.

*To all whom it may concern:*

Be it known that I, CHARLES FARMER, subject of the King of Great Britain, residing at Romsley, near Halesowen, county of Worcester, England, have invented certain new and useful Improvements in Potato-Planting Machines, of which the following is a specification.

This invention relates to potato planting machines of that type comprising a number of revolving arms or members adapted to enter a hopper or receptacle containing the potatoes so as to remove the latter from the said hopper or receptacle and automatically deposit them in the trench prepared or upon the ground, suitable means being provided for removing the potatoes from the arms at the required instant.

The principal object of the present invention is to provide an improved construction of potato planting machine of the above type having means for effectively preventing jamming or sticking of the potatoes within the hopper or container, so that an uninterrupted delivery of potatoes from the hopper may be obtained.

Another object is to ensure the lowest potato in the hopper being held in a central position so as to ensure being pierced by the needle or spike.

A further object is to provide a more positive and effective means for causing the needles or spikes to engage the potatoes, said means being independent of the speed at which the machine is driven over the ground.

Another object is to provide improved means for removing stones from that part of the hopper in which the needles engage the potatoes.

A still further object is to provide improved means for releasing the potatoes.

Figure 1 of the accompanying drawings is a side elevation of a potato planting machine constructed in accordance with this invention, the ground wheel (of which one only is shown) being partly broken away. For the sake of clearness the figure illustrates one set of arms only, it being understood, however, that two sets of arms moving in parallel planes are employed.

Figure 3 is a plan view of the hopper and of the separated bands or rims which serve as guides for the arms.

Figure 4 is a vertical section through the hopper on the line IV—IV, Figure 3, showing the two depending cones with which the hopper is provided, and also showing a portion of the separated guide bands.

Figure 5 shows a sectional view of the hopper, illustrating the manner in which the potatoes are removed by the arms one at a time, and showing the agitator bar, by which each arm is preceded, entering the lower end of the respective cone portion of the hopper.

Figure 6 is a sectional view showing, upon a larger scale, the two cones of the hopper and illustrating the manner in which the agitator-bar enters the one cone whilst the carrier arm is leaving the other cone.

Figure 7 is a view showing how the needles are detachably carried by the arms.

The same reference numerals indicate corresponding parts in each of the figures.

Figure 2:
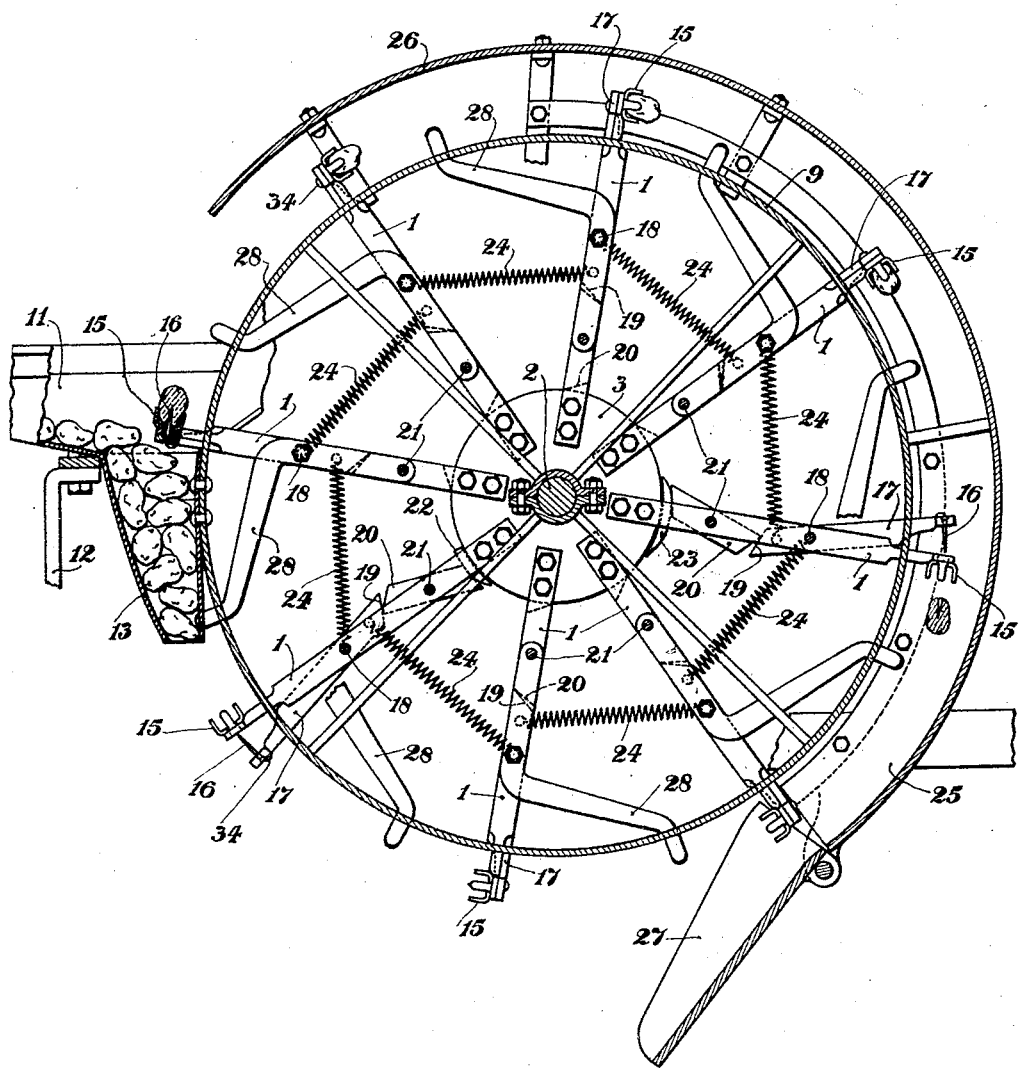
Figure 2 is an elevational view showing the one set of arms upon a larger scale, the hopper, and the chute into which the potatoes are delivered, being shown in section.

Referring to the drawings, the improved potato planting machine comprises two sets of radial arms 1 which are secured to a common axle 2 by metal discs 3 carried by the latter, forming a wheel or revolving frame, the two sets of arms being adapted to move in parallel planes, on the said axle being rotated, the arms of the one set being arranged midway between the arms of the other set. To admit of the axle 2 being rotated it is provided at its one end with a toothed wheel 4 (Figure 1) which is driven through the medium of an intermediate gear wheel 5, by a toothed wheel 6 carried by one of the ground wheels 7 of the machine. The manner in which the gearing may be arranged is shown in Figure 1 of the drawings, the said figure showing a portion of one of the ground wheels only. It is understood however, that a pair of ground wheels are provided, these wheels supporting a frame 8 provided with bearings within which is rotatably mounted the axle 2 carrying the two sets of arms. Thus, as the wheels are moved over the ground, the arms 1 are caused automatically to revolve. The outer.

ends of the arms are guided by three fixed bands or rims 9 which are laterally separated so as to form between them a pair of circumferential slots 10 within which the outer ends of the arms of the two sets respectively move. These three separated bands or rims are carried by the frame of the machine in any suitable manner, and lie concentric with the said central axle 2. At the rear end of the machine a hopper or container 11 is provided within which the potatoes to be planted are placed, this hopper being rigidly attached to the three fixed bands 9 by rivets or other means and being, in addition, supported by brackets 12 carried by the frame 8. The forward side of the hopper, that is the side adjacent the guide bands 9, is formed with a pair of separated vertical slots corresponding to, and registering with, the slots 10 in the latter, and the lower portion of the hopper terminates in a pair of separated cones 13, the two slots being continued downwards, so that one slot extends into each cone and continues to the bottom or lower open end of the same, which is truncated as shown. The outer walls of the cones extend above the junction of the inner walls and are continued into a single funnel-shaped or conical chamber 14 intermediate the hopper proper 11 and the said cones, the inclined sides of the chamber 14 forming a wider angle between them than do the sides of the cones 13. The two separated cone-extensions 13 together lie in a plane parallel to the axle 2, and as the two sets of arms 1 are rotated their outer ends move within the slots 10 between the guide bands 9 in a direction so as to approach the cones of the hopper from beneath, the ends of the arms of each set successively entering the open lower end of the respective cone and moving upwards within the latter. Each arm 1 carries upon its end a skeleton cup 15 having four or other suitable number of equally-spaced curved fingers. The base of the cup 15 has a hole to receive and guide a needle or spike 16 detachably mounted at the free end of a lever 17 pivoted at 18 to the arm 1. The needle may be carried upon the arm by passing its shank through a hole in the arm so that a conical head 33 on its lower end engages the countersunk end of said hole and is held in place by a screw 34 overlapping the said head, as shown in Figure 7. The lever 17 has a bevelled inner end 19 normally abutting or overlapping the reversely-bevelled end of a second lever 20 pivoted at 21 to the arm 1. The inner end of this lever 20 is suitably shaped to engage two stationary cams 22, 23, upon a fixed part of the machine, and tension springs 24 are connected between the inner end of each lever 17 and the next arm 1, so as to tend to cause the needle 16 to enter the cup 15. The cams 22 are so shaped and situated that as the machine is driven over the ground they are engaged by the levers 20 in succession so as to withdraw the needles from the cups 15 shortly before the latter enter the lower open ends of the cones 13, as shown at the lower left-hand side of Figure 2, thereby extending the respective spring 24. As the cup 15 enters one of the cones 13 a potato is received therein; and the cam 22 is so shaped that while the cup is still in the cone a sudden release is given to the levers 17, 20, causing the needle 16 to snap suddenly forward under the influence of the spring 24 and thereby stab the potato contained within the cup. The potatoes are thus carried round with the arms 1.

The second cam 23 is engaged by the levers 20 in succession as they reach the side of the machine remote from the hopper, and causes the needle to be positively withdrawn from the potato, thus allowing the potato to drop into a chute 25 by means of which it is delivered into the trench prepared for it. The cam 23 is preferably shaped to give a gradual release. The chute 25 is of a channel section and is fixed to a suitable part of the machine frame, being arranged adjacent the fixed guide-bands 9, at the side thereof opposite to the hopper. The said chute is preferably continued into a guard 26 which surrounds the upper portion of the fixed guide bands, whilst the lower end is preferably provided with a hinged extension 27 which may be adjusted according to the depth of the trench. Arranged between each pair of arms 1 of each set is an agitator-bar 28 which is attached to an adjacent arm. These agitator-bars are formed with flat ends without needles, and they are slightly shorter than the arms 1, so that they project only a short distance through the slots in the respective cones 13 of the hopper, but just sufficiently to agitate or disturb the potatoes therein to prevent jamming, but without moving the lowest potato in the cone.

An auxiliary agitator device is also employed consisting of two toothed or spiked wheels 29 mounted to revolve at the outside of the upper ends of the respective cones 13 so that the teeth or projections move through slots and enter the hopper at the junction of the cones 13 with the conical chamber 14, as shown in Figures 4 and 6, thereby constantly raising and disturbing the potatoes at each side of the hopper and preventing them from falling into the cones at the sides. These agitator wheels 29 are conveniently carried on shafts 30 carrying a friction pinion 31 engaged and driven by a friction ring 32 fixed upon the arms 1, as shown in Figure 1.

In operation, the hopper having been filled with the potatoes to be planted, certain of these potatoes enter the cones 13 and the lowest potato in each cone is rigidly and centrally held or supported by the side walls at a height depending upon the size of the potato, ready for being pierced by the needle. The two sets of arms 1 are now set in motion by moving the machine over the ground. The end of one of the agitator bars 28 enters the respective cone 13, into which it projects just sufficiently to dislodge any potatoes that may have become jammed, and the agitator wheels 29 disturb the potatoes above the cones. The lever 17 on the nearest carrier arm which is approaching the hopper has meanwhile been depressed by the action of the cam 22 so as to withdraw the needle 16 from the cup 15, as shown at the lower left-hand side of Figure 2. The cup enters the open lower end of the cone 13 and receives in it the lowest potato which it commences to carry upwards, but the lever 17 is suddenly released with a snap action due to the lever 20 leaving the cam 22, and the needle is thereupon projected upwards and spears or stabs the potato resting in the cup. The speared potato is thus carried towards the top of the hopper and is taken round to the chute 25, where it is ejected by the action of the cam 23, as previously described. As the arm 1 reaches the top of the one cone 13 it disturbs or agitates the potatoes above or near the top of the adjacent cone 13, and thereby prevents jamming of the potatoes in the hopper immediately above the cones. By this time one of the arms of the set upon the other side of the machine is now entering the adjacent cone, in which the potatoes have previously been agitated or disturbed by its preceding agitator bar 28. The needle on the said arm now spears one of the potatoes in the said cone by the action of the cam and springs, as previously described, and in turn carries it to the top of the hopper, in so doing disturbing the potatoes above the first cone. The potatoes above the latter are thus dislodged in turn and likewise prevented from jamming. This process is repeated as long as the arms are rotated and any potatoes remain in the cones, the two cones being engaged in turn by the arms of the respective sets, so that the potatoes in the funnel-shaped or conical chamber 22 above the two cones are constantly disturbed and any jamming thereby prevented, jamming of the potatoes within the cones themselves being prevented by the agitator-bars 28 by which the arms 1 are preceded. It is thus impossible for the machine to fail to function from the above cause, and owing to the size of the cones a potato must necessarily be speared as the arms pass through the latter.

It is necessary that the carrier-arms 1 of the two sets should be staggered relatively to one another so that they do not enter the respective cones at the same time, and so that the potatoes above each cone are disturbed prior to the respective arm entering the latter.

The skeleton cups 15 will convey any stones or other undesirable foreign substances to the upper part of the hopper, allowing the potatoes to position themselves correctly in the lower ends of the cones.

Having fully described my invention, what I desire to claim and secure by Letters Patent is:—

1. A potato planting machine, comprising a hopper having its lower portion extended into a plurality of depending hollow conical portions open at their lower ends and at one side, and a plurality of relatively-staggered sets of potato removing devices rotatable about a common axis, the potato removing devices of each set being adapted to enter the open lower end of the respective depending portion and to move substantially vertically upward within the latter substantially along the vertical axis of the depending portions into the upper portion of the hopper so as to agitate the potatoes within the latter and above the adjacent depending portion, the depending portions each serving to hold the potatoes above and in the direct line of travel of the respective removing device.

2. A potato planting machine, comprising a hopper having a single wide funnel-shaped intermediate portion terminating in a plurality of depending hollow conical portions open at their lower ends and at one side, and a plurality of relatively-staggered sets of potato removing devices rotatable about a common axis, the potato removing devices of each set being adapted to enter the open lower end of the respective depending portion and to move substantially vertically upward within the latter substantially along the vertical axis of the depending portions through the intermediate portion, thereby to agitate the potatoes in the latter above the adjacent depending portion.

3. A potato planting machine comprising a hopper having a plurality of hollow depending portions arranged side-by-side for receiving the potatoes from the hopper, a plurality of relatively staggered sets of potato removing devices rotatable about a common axis as the machine moves over the ground and adapted to enter the respective depending portions of the hopper so as to remove the potatoes therefrom, and agitator members situated between successive potato removing devices and adapted to enter the respective depending portions in order to agitate the potatoes.

4. A potato planting machine comprising a hopper, a set of potato removing devices rotatable about an axis as the machine moves over the ground, and adapted to enter the hopper so as to remove potatoes therefrom, and agitator members situated between successive potato removing devices and adapted to enter the hopper in order to agitate the potatoes.

5. A potato planting machine comprising a hopper, a rotatable frame driven by the motion of the machine over the ground, arms carried by the said frame and adapted to move through the hopper, a set of spring-controlled levers mounted on said frame, potato piercing devices carried by the outer ends of said levers and normally engaging openings in the ends of said arms, a second set of levers mounted upon the rotatable frame and whose outer ends engage the inner ends of the first set of levers, and a fixed cam co-operating with the inner ends of the second set of levers to cause the first set of levers to move angularly and the potato-piercing devices to be withdrawn from the openings in the arms and to move forward with a snap action when within the hopper in order to pierce the potatoes.

6. A potato planting machine comprising a hopper, a rotatable frame driven by the motion of the machine over the ground, arms carried by the said frame and adapted to move through the hopper, a set of spring-controlled levers mounted on said frame, potato-piercing devices carried by the outer ends of said levers and normally engaging openings in the ends of the arms, a second set of levers mounted upon the rotatable frame and whose outer ends engage the inner ends of the first set of levers, a fixed cam co-operating with the inner ends of the second set of levers to cause the first set of levers to move angularly and the potato-piercing devices to be withdrawn from the openings in the arms and to move forward with a snap action when within the hopper in order to pierce the potatoes, and a second fixed cam cooperating with the inner ends of the second set of levers to cause the potato-piercing devices to be withdrawn from the openings in the arms in order to discharge the potatoes.

7. A potato planting machine comprising a hopper having a plurality of hollow slotted depending portions arranged side by side for receiving the potatoes from the hopper, a plurality of relatively staggered sets of potato removing devices rotatable about a common axis as the machine moves over the ground and adapted to enter the respective depending portions of the hopper so as to remove potatoes therefrom, a single wide funnel-shaped chamber intermediate the upper ends of the depending portions of the hopper and the upper portion of the hopper, and rotating agitator devices situated at the sides of the single funnel shaped chamber in order to prevent potatoes falling into the depending portions from the sides of said funnel-shaped chamber.

In testimony whereof I have hereunto set my hand.

CHARLES FARMER.